US006622008B2

(12) United States Patent
Kroeger et al.

(10) Patent No.: US 6,622,008 B2
(45) Date of Patent: Sep. 16, 2003

(54) METHOD AND APPARATUS FOR REDUCTION OF FM INTERFERENCE FOR FM IN-BAND ON-CHANNEL DIGITAL AUDIO BROADCASTING SYSTEM

(75) Inventors: Brian William Kroeger, Sykesville, MD (US); Jeffrey Scott Baird, Elkridge, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/860,246

(22) Filed: May 18, 2001

(65) Prior Publication Data

US 2001/0023175 A1 Sep. 20, 2001

Related U.S. Application Data

(62) Division of application No. 09/192,555, filed on Nov. 3, 1998, now Pat. No. 6,259,893.

(51) Int. Cl.[7] .................................................. H04B 1/00
(52) U.S. Cl. ........................... 455/61; 455/74; 455/143; 375/346; 375/350
(58) Field of Search ........................... 455/61, 74, 143; 375/216, 226, 229, 316, 326, 346, 350; 370/207, 208, 350, 480

(56) References Cited

U.S. PATENT DOCUMENTS

| | | | | |
|---|---|---|---|---|
| 5,280,525 A | * | 1/1994 | Wesel | 379/400 |
| 5,424,638 A | * | 6/1995 | Huber | 324/212 |
| 5,697,086 A | * | 12/1997 | Svoboda | |
| 5,724,657 A | * | 3/1998 | Lin et al. | |
| 5,850,415 A | * | 12/1998 | Hunsinger et al. | |
| 6,006,083 A | * | 12/1999 | Tong et al. | |
| 6,021,156 A | * | 2/2000 | Wagner | 327/310 |
| 6,151,373 A | * | 11/2000 | Dodley | |
| 6,178,317 B1 | * | 1/2001 | Kroeger et al. | |
| 6,185,195 B1 | * | 2/2001 | Leung | |
| 6,215,815 B1 | * | 4/2001 | Chen et al. | |
| 6,259,893 B1 | * | 7/2001 | Kroeger et al. | |
| 6,560,293 B1 | * | 5/2003 | Alelyunas et al. | |

* cited by examiner

*Primary Examiner*—Curtis Kuntz
*Assistant Examiner*—Barry W Taylor
(74) *Attorney, Agent, or Firm*—Robert P. Lenart, Esq.; Pietragallo, Bosick & Gordon

(57) ABSTRACT

This invention provides a method for reducing FM interference in an in-band on-channel digital audio broadcasting system. The method includes the steps of receiving a composite signal including a signal of interest and an interfering signal and normalizing the composite signal to produce a normalized composite signal. The composite signal is then multiplied by the complex conjugate of the normalized composite signal to produce a real signal. Then the real signal is filtered and the resulting filtered signal is multiplied by the normalized composite signal to produce an output signal. The adverse effects of the interfering signal in the output signal are reduced with respect to the magnitude of the signal of interest reducing FM interference in an in-band on-channel digital audio broadcasting system, thereby making it easier to detect the signal of interest. The output signal and the composite can be blended in response to the power of the real and filtered signals Radio receivers that utilize the above method are also included.

21 Claims, 4 Drawing Sheets

METHOD AND APPARATUS FOR REDUCTION OF FM INTERFERENCE FOR FM IN-BAND ON-CHANNEL DIGITAL AUDIO BROADCASTING SYSTEM

CROSS REFERENCE TO RELATED APPLICATION

This is a divisional application of application Ser. No. 09/192,555, filed Nov. 3, 1998 now U.S. Pat. No. 6,259,893.

BACKGROUND OF THE INVENTION

This invention relates to signal processing, and more particularly, to signal processing techniques for use in Digital Audio Broadcasting (DAB) systems.

Digital Audio Broadcasting is a medium for providing digital-quality audio, superior to existing analog broadcasting formats. Both AM and FM DAB signals can be transmitted in a hybrid format where the digitally modulated signal coexists with the currently broadcast analog AM or FM signal, or in an all-digital format without an analog signal. In-band-on-channel (IBOC) DAB systems require no new spectral allocations because each DAB signal is simultaneously transmitted within the same spectral mask of an existing AM or FM channel allocation. IBOC systems promote economy of spectrum while enabling broadcasters to supply digital quality audio to their present base of listeners. Several IBOC DAB approaches have been suggested.

FM DAB systems have been the subject of several United States patents including U.S. Pat. Nos. 5,465,396; 5,315,583; 5,278,844 and 5,278,826. More recently, a proposed FM IBOC DAB signal places orthogonal frequency division multiplexed (OFDM) sub-carriers in the region from about 129 kHz to 199 kHz away from the FM center frequency, both above and below the spectrum occupied by an analog modulated host FM carrier. Some IBOC options (e.g., All-Digital option) permit subcarriers starting as close as 100 kHz away from the center frequency.

The digital portion of the DAB signal is subject to interference, for example, by first-adjacent FM signals or by host signals in Hybrid IBOC DAB systems. Signal processing techniques are required to separate out the signals of interest in the presence of the interferers.

One FM extraction technique called COLT (COntinuous Look Through) can be used to extract a narrowband signal from beneath a wideband FM signal. This technique is described in U.S. Pat. Nos. 5,263,191; 5,428,834; and 5,355,533. The method described in those patents uses, in effect, a notch filter which tracks and suppresses the FM instantaneous frequency of an interfering signal.

FM IBOC DAB signals are subject to various fading conditions and bandwidth properties which limit that effectiveness of prior art COLT techniques. The is a need for a signal extraction technique that is effective for in-band on-channel digital audio broadcast signals under fading conditions.

SUMMARY OF THE INVENTION

This invention provides a method for reducing FM interference in an in-band on-channel digital audio broadcasting system. The method includes the steps of receiving a composite signal including a signal of interest and an interfering signal and normalizing the composite signal to produce a normalized composite signal. The composite signal is then multiplied by the complex conjugate of the normalized composite signal to produce a real signal. Then the real signal is filtered and the resulting filtered signal is multiplied by the normalized composite signal to produce an output signal. The adverse effects of the interfering signal in the output signal are reduced relative to the signal of interest in the original composite signal, thereby making it easier to detect the signal of interest. In this context, adverse effects refers to such effects as corruption of the detected symbols resulting in increased bit error rate (BER)

The invention also encompasses a method for processing an in-band on-channel digital audio broadcasting signal, the method comprising the steps of receiving a composite signal including a signal of interest and an interfering signal; filtering the composite signal to produce a filtered signal; and blending the filtered signal with the composite signal to produce a blended output signal.

In addition, the invention includes radio receivers that utilize the above methods for separating a signal of interest from a composite signal and for blending the filtered and composite signals.

Although the technique described here is well-suited to mitigating the effects of a first-adjacent FM interferer, it can also be used to mitigate the effects of the host FM signal when the DAB signal is placed closer to its FM host. However, the limiting factor in the latter case tends to be the interference of the DAB signal onto its FM host.

DESCRIPTION OF THE PREFERRED EMBODIMENTS

Figure 1:
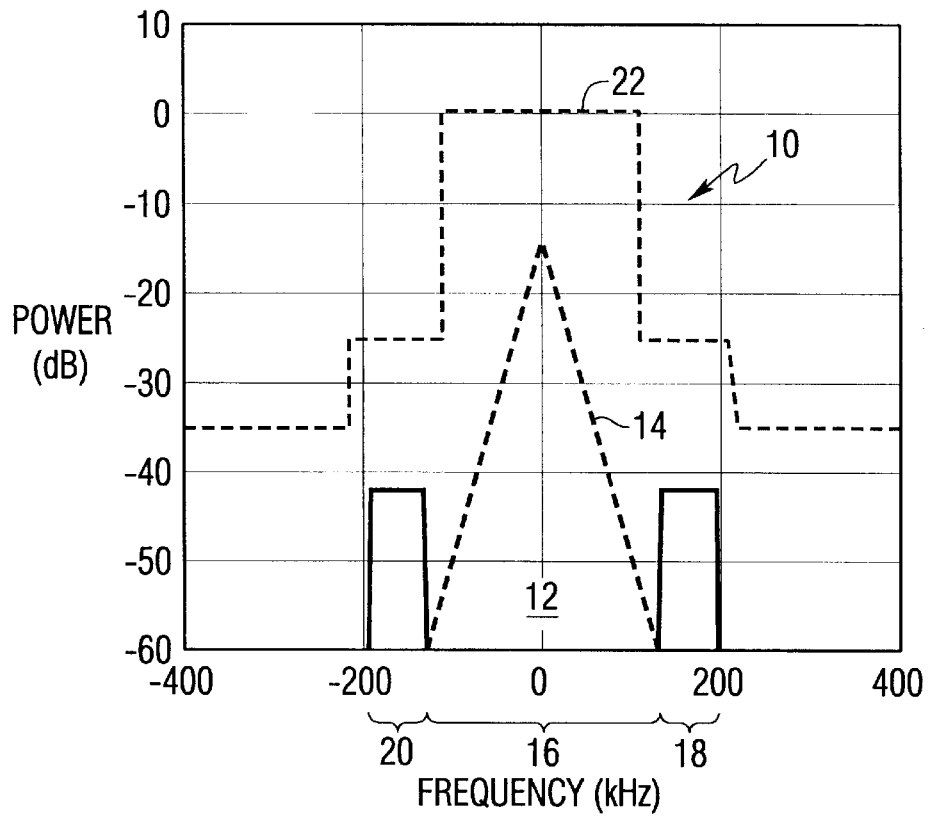
FIG. 1 is a diagram showing power spectral densities of an FM In-Band On-Channel Digital Audio Broadcast signal.

Referring to the drawings, FIG. 1 is a schematic representation of the frequency allocations (spectral placement) and relative power spectral density of the signal components for a hybrid FM IBOC DAB signal 10. The hybrid format includes the conventional FM stereo analog signal 12 having a power spectral density represented by the triangular shape 14 positioned in a central, or central frequency band, 16 portion of the channel. The Power Spectral Density (PSD) of a typical analog FM broadcast signal is nearly triangular with a slope of about −0.35 dB/kHz from the center frequency. A plurality of digitally modulated evenly spaced sub-carriers are positioned on either side of the analog FM signal, in an upper sideband 18 and a lower sideband 20, and are transmitted concurrently with the analog FM signal. All of the carriers are transmitted at a power level that falls within the United States Federal Communications Commission channel mask 22.

In one example of a hybrid FM IBOC modulation format, 95 evenly spaced orthogonal frequency division multiplexed (OFDM) digitally modulated sub-carriers are placed on each side of the host analog FM signal occupying the spectrum from about 129 kHz through 198 kHz away from the host FM center frequency as illustrated by the upper sideband 18 and the lower sideband 20 in FIG. 1. In the hybrid system the total DAB power in the OFDM digitally modulated sub-carriers in each sideband is set to about −25 dB relative to its host analog FM power.

Figure 2:
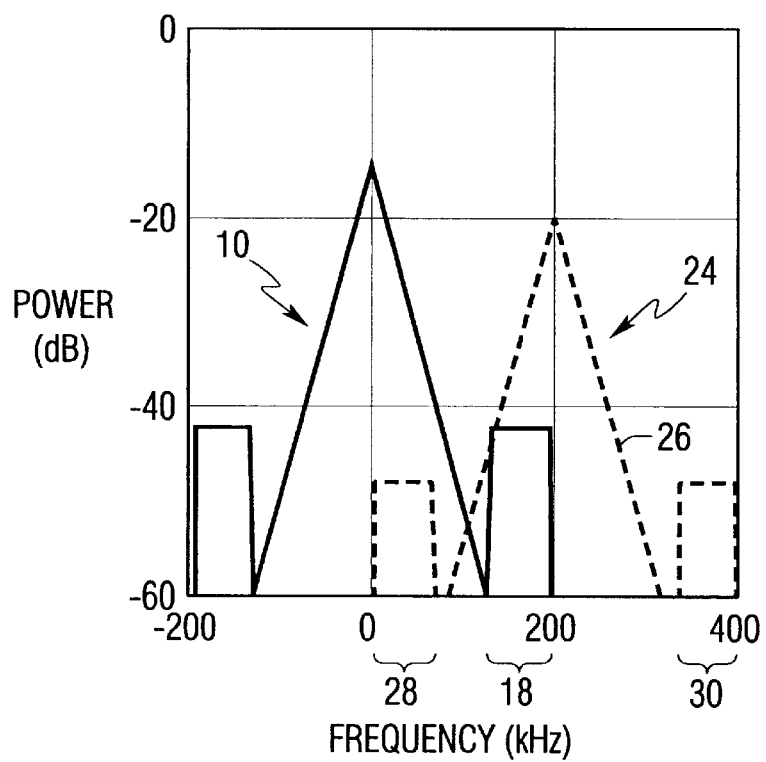
FIG. 2 is a diagram showing the power spectral densities of two FM In-Band On-Channel Digital Audio Broadcast signals in adjacent channels.

Signals from an adjacent FM channel (i.e. the first adjacent FM signals), if present, would be centered at a spacing of 200 kHz from the center of the channel of interest. FIG. 2 shows a spectral plot of a hybrid DAB signal 10 with an upper first adjacent interferer 24 having an analog modulated signal 26 and a plurality of digitally modulated sub-carriers in sidebands 28 and 30, that are at a level of about −6 dB relative to the signal of interest (the digitally modulated sub-carriers of signal 10). The figure shows that the DAB upper sideband 18 is corrupted by the analog modulated signal in the first adjacent interferer. The present invention provides a first adjacent canceller (FAC) that is able to suppress the effects of the interference in this situation. It has been demonstrated that the FAC is able to deal with first adjacent interferers on both upper and lower DAB sidebands, and successfully recover the DAB signal buried beneath them. The DAB signal is extracted from below the interfering FM carrier, although the extraction process distorts the DAB signal. It is assumed that the DAB signal is small relative to the interfering first adjacent analog FM signal such that FM tracking and cancellation can be effective.

In the absence of fading the composite analog FM plus DAB signals can be modeled as:

$$s(t)=a \cdot e^{j \cdot \theta(t)}+d(t)$$

where a is the amplitude and θ(t) is the instantaneous phase of the of the FM signal, and d(t) is the DAB signal. Without loss of generality, we can assume that the average power of d(t) is one. Furthermore, we assume that a>>1 so that the FM capture effect is invoked. Notice that the signal amplitude is assumed to be constant since no fading of the signal is assumed in this part of the analysis. Also notice that this is the ideal case without noise. If this signal is processed using the techniques shown in U.S. Pat. Nos. 5,263,191; 5,428,834; and 5,355,533, then the output can be approximated by:

$$COLT\_OUT(t) \approx d(t)+d^*(t) \cdot e^{j \cdot 2\theta(t)}$$

The first term of the COLT output is the desired term while the second term is interference. Although the interference term has the same power as the first term, its spectrum is convolved with the square of the FM signal which has twice the FM modulation bandwidth.

If the bandwidth of the DAB signal equals the bandwidth of the interfering FM signal, and if the DAB signal is centered on the FM signal, the resulting signal to interference ratio using the prior art COLT technique is reduced to a few dB at most. Another large source of degradation is multipath fading. The fading results in amplitude modulation of the instantaneous FM carrier. Selective fading can result in an amplitude modulation bandwidth on the order of the FM baseband bandwidth (i.e. 53 kHz), while the bandwidth due to dynamic flat fading is limited to about 13 Hz at maximum highway speeds in an automobile receiver. Since the extraction process of U.S. Pat. Nos. 5,263,191; 5,428,834; and 5,355,533 uses the input signal directly to control the center frequency of the notch, the amplitude modulation on the input signal due to fading will affect the performance.

In the presence of fading the composite analog FM plus digitally modulated sub-carriers signals can be modeled as:

$$s(t)=[a+f(t)] \cdot e^{j \cdot \theta(t)}+d(t),$$

where f (t) is a dynamic fading term which is due to amplitude modulation of the FM carrier as it travels across the selectively faded deviation bandwidth. This amplitude modulation has a bandwidth on the order of the FM baseband bandwidth (i.e. 53 kHz). The slow fading component due to Raleigh fading is limited to about 13 Hz at highway speeds at a carrier frequency in the 100 MHz range. This slow fading component is omitted from this model since it is assumed to be nearly constant over the analysis window. In the presence of selective fading, the additional interference components become significant.

The prior art notch filtering technique assumed that the input signal itself is a good approximation of the FM signal, since the ratio of the analog FM power to the DAB power is high. However, where the input signal is subject to fading and is not a good approximation of the FM signal, the processing steps can create an image which cannot be removed in subsequent stages.

Figure 3:
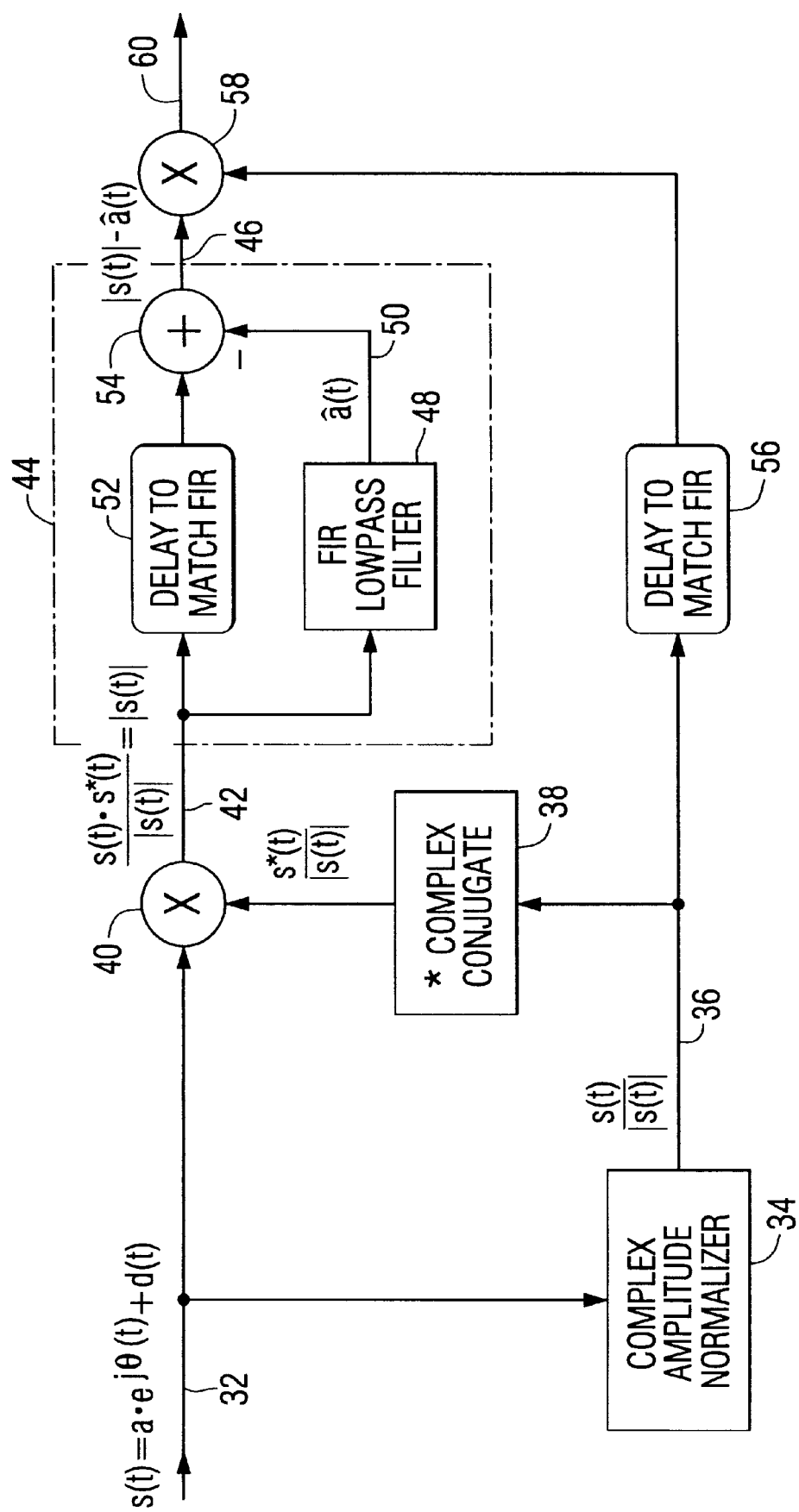
FIG. 3 is a block diagram that illustrates the signal processing method of the present invention.

The present invention solves this problem using a normalized signal extraction process. We observe that a first multiplication of a signal shifts the instantaneous FM frequency to zero, while a second multiplication should perform the inverse of the first multiplication. Ideally, we note that if the first and second signals are complex conjugates, and if the product of their amplitudes remains a fixed constant value, then the signal should be perfectly restored in phase and amplitude (minus the filtered out FM carrier). Unfortunately, dynamic fading and selective fading result in amplitude variations with the fading rate and the baseband signal bandwidth. The additional step to normalize the amplitude of the reference eliminates the generation of some of the undesirable interference associated with the original COLT technique. This normalized extraction process is shown in FIG. 3.

The composite signal:

$$s(t)=a \cdot e^{j \cdot \theta(t)}+d(t),$$

is received on line 32. Block 34 illustrates that the input is normalized by dividing by its absolute value to produce a normalized signal on line 36. In the presence of fading the composite analog FM plus DAB signals after normalization can be approximately modeled as:

$$\frac{s(t)}{|s(t)|} \cong e^{j \cdot \theta(t)} + \frac{d(t)}{[a+f(t)]},$$

where it is assumed that the FM analog signal is much larger than the digital DAB signal. The complex conjugate of the normalized signal is produced as illustrated by block 38, and the composite signal is multiplied by its normalized complex conjugate, as illustrated by multiplier 40, to yield the intermediate signal:

$$s(t) \cdot \frac{s^*(t)}{|s^*(t)|} = \{[a+f(t)] \cdot e^{j \cdot \theta(t)} + d(t)\} \cdot \left\{ e^{-j \cdot \theta(t)} + \frac{d^*(t)}{[a+f(t)]} \right\},$$

on line 42. A dc notch operation, illustrated by block 44, removes the constant term a to yield:

$$s(t) \cdot \frac{s^*(t)}{|s^*(t)|} - a = f(t) + d^*(t) \cdot e^{j \cdot \theta(t)} + d(t) \cdot e^{-j \cdot \theta(t)} + \frac{|d(t)|^2}{[a + f(t)]},$$

on line 46. A low pass finite impulse response filter 48 produces an estimate of the constant term on line 50. The signal on line 42 is delayed as illustrated by block 52 to match the filter delay and the output of the filter is subtracted from the delayed signal as shown by adder 54 to produce the intermediate signal on line 46. It should be noted that the DAB signal in the vicinity of the notch is also suppressed and the notch filtering has some effect on the integrity of the DAB signal. Lastly this intermediate signal is multiplied in multiplier 58 by the normalized original composite signal, which has been delayed as shown by block 56, to yield the output signal on line 60:

$$\frac{s(t)}{|s(t)|} \cdot \left\{ s(t) \cdot \frac{s^*(t)}{|s^*(t)|} - a \right\} = d(t) + d^*(t) \cdot e^{j \cdot 2 \cdot \theta(t)} + f(t) \cdot e^{j \cdot \theta(t)} +$$

$$\frac{f(t) \cdot d(t)}{[a + f(t)]} + \frac{d^2(t) \cdot e^{-j \cdot \theta(t)}}{[a + f(t)]} + 2 \cdot$$

$$\frac{|d(t)|^2 \cdot e^{j \cdot \theta(t)}}{[a + f(t)]} + \frac{|d(t)|^2 \cdot d(t)}{[a + f(t)]^2}$$

Assuming that the FM signal is much larger than the DAB signal, which is the usual case, then the output can be approximated by:

$$\frac{s(t)}{|s(t)|} \cdot \left\{ s(t) \cdot \frac{s^*(t)}{|s^*(t)|} - a \right\} \cong d(t) + d^*(t) \cdot e^{j \cdot 2 \cdot \theta(t)} + f(t) \cdot \left\{ e^{j \cdot \theta(t)} + \frac{d(t)}{[a + f(t)]} \right\}.$$

The equation above shows that if the selective fading-induced amplitude modulation term f(t)=0, then the original COLT method result is achieved. However, in the presence of selective fading, the additional interference terms can be compared to those of the COLT technique under selective fading conditions. Specifically if:

$$e^{j \cdot \theta(t)} + \frac{d(t)}{[a + f(t)]} < \frac{1}{a^2} \left\{ \begin{array}{c} [4 \cdot a + 2 \cdot f(t)] \cdot d(t) + [a + f(t)] \cdot \\ [2a + f(t)] \cdot e^{j \cdot \theta(t)} + \\ [2 \cdot a + f(t)] \cdot e^{j \cdot 2 \cdot \theta(t)} \cdot d^*(t) \end{array} \right\}$$

then the self-induced noise using the method of this invention is lower. The above inequality can be approximated by further elimination of less significant terms that are much less than one to yield:

$$e^{j \cdot \theta(t)} < 2 \cdot e^{j \cdot \theta(t)}$$

This shows a potential 6 dB improvement in noise reduction due to selective fading using the normalization technique.

It should now be apparent that the present invention reduces the adverse effects of the interfering signal in the output, for example by increasing the magnitude or power spectral density of the signal of interest with respect to the interfering signal.

The FM cancellation process as described above is directly applicable to the FM IBOC DAB system whenever there is a first adjacent interfering FM signal. The first adjacent interfering FM signals can be processed and effectively canceled/notched out of the digital portion of the DAB signal with a reasonably small amount of distortion resulting to the DAB signal. The distortion will be fairly small if the following three conditions are met prior to initiating the FM cancellation process.

1) The only signals present that have significant power are the first adjacent FM and the digital portion of the DAB signal that is being interfered with (i.e. the upper or the lower digital side band of the DAB signal). This can be accomplished simply by mixing the FM interferer to 0 Hz and low-pass filtering the resulting signal or by band-pass filtering the resulting signal.
2) The digital signal is completely contained on either the upper or lower half the first adjacent FM signal. This is inherently done within the layout of an IBOC DAB system wherein the edge of the digital signal is placed almost out to +/−200 kHz, which is the center of the first adjacent FM signal. Therefore, the digital signal is contained on one half of the FM interferer. This is important since the undesirable distortion or image produced by this extraction process appears on the spectral side opposite the placement of the DAB signal relative to the FM signal.
3) The first adjacent FM signal is about 6 dB stronger in power than the digital signal. When the first adjacent power becomes to low, it is better not to perform FAC. This ensures that the FM signal is sufficiently large compared to the DAB signal such that the capture effect is invoked. In a multipath fading environment the FM signal will sometimes fall below the 6 dB more power threshold and thus a switching off algorithm is recommended.

Within one proposed FM IBOC system, the three conditions will be present some of the time especially in the regions at the edge of an FM stations coverage. First adjacent FM cancellation will provide interference mitigation and thus extend the stations coverage.

Figure 4:
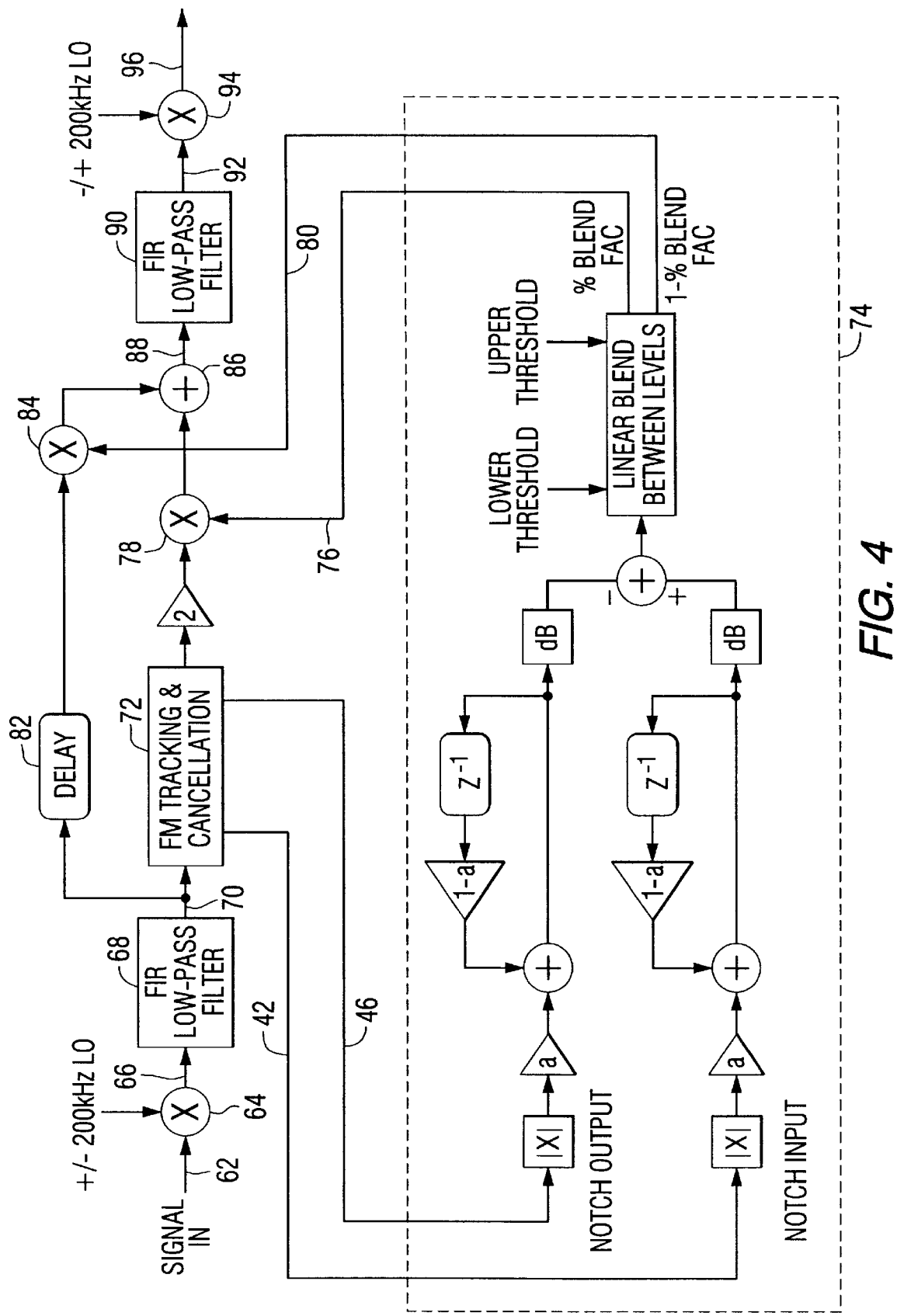
FIG. 4 is a block diagram that illustrates the operation of a first adjacent canceller (FAC) in accordance with this invention.

One method of switching on/off the FAC is to smoothly blend to and from the non FAC processed signal. A measurement of the amount of power that is being notched can be made by taking the difference between the power that goes into the notch and the power that comes out of the notch. The two signals are smoothed using a simple lossy integrator before the difference is calculated. FIG. 4 is a block diagram which illustrates the FAC and blending functions, which can be performed on both upper and lower interfering first adjacent FM signals. The composite signal is input on line 62 and mixed with a local oscillator signal in mixer 64 to produce a baseband signal on line 66 where the first adjacent interferer is translated to dc. The signal is filtered by a finite impulse response low pass filter 68 to remove signals outside the bandwidth of the interfering FM signal. The resulting signal on line 70 is then subject to FM tracking and cancellation as illustrated in block 72. The cancellation is performed as illustrated in FIG. 3, with the signal before and after the notch filter being output on lines 42 and 46. In the blend control block 74, the notched power in dBs is compared to an upper and lower threshold that represents the range in which the blending will occur. The range is normalized so that where the amount of notched power resides within the unnormalized range, it can be represented by a straight percentage of the range. The control signal on line 76 is representative of a percentage number that is used to multiply the FAC processed signal in multiplier 78. A control signal on line 80 is representative of one minus the percentage number, and is used to multiply the non-FAC processed signal, which has been delayed as shown in block 82. The outputs of multipliers 78 and 84 are combined in summer 86 to produce a signal on line 88 that is filtered by a finite impulse response filter 90. The resulting filtered signal on line 92 is again mixed with a local oscillator signal in mixer 94 to produce an output signal on line 96. This output signal is then subject to further processing in accordance with known techniques to produce an audio output from the receiver. This blending produces a smooth transition between FAC and non-FAC and is applicable to receivers implementing various interference cancellation techniques including those illustrated in FIG. 3 as well as those disclosed in the above mentioned patents.

Figure 5:
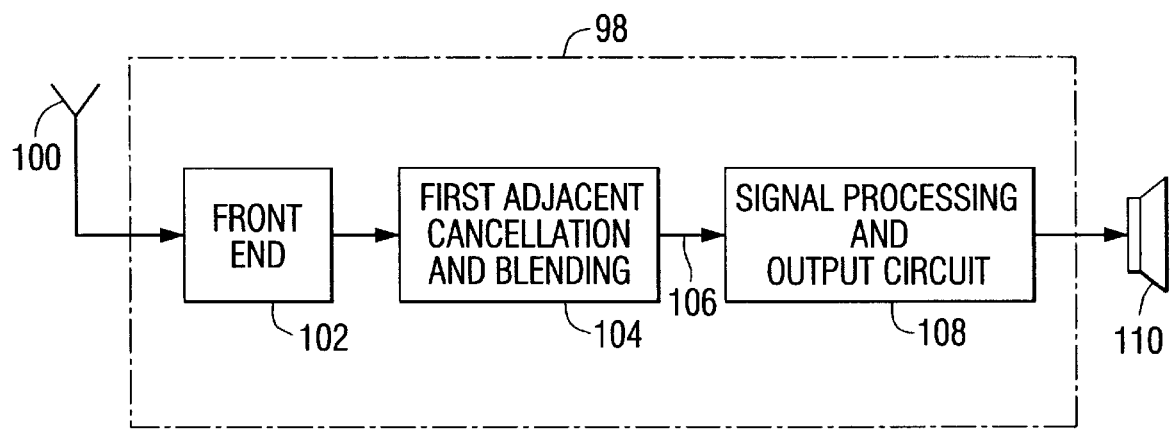
FIG. 5 is a block diagram of a receiver constructed in accordance with this invention.

FIG. 5 is a block diagram of a radio receiver 98 constructed in accordance with the present invention. Antenna 100 serves as a means for receiving an in-band on-channel digital audio broadcast signal including a signal of interest in the form of a plurality of OFDM digitally modulated sub-carriers and an analog FM carrier interferer. The receiver includes front end circuits that are constructed in accordance with well known techniques. After front end processing, the composite signal on line 102 is subject to first adjacent canceling and blending in accordance with the method discussed above as illustrated in block 104. The blended signal on line 106 is subject to further processing in accordance with known techniques to produce an output signal on line 108 and an audio output from speaker 110.

The normalization process used in this invention improves the performance under selective fading conditions. Besides being convenient for amplitude scaling, the normalization has a secondary effect of reducing amplitude variations of the DAB signal which are tracked by Channel State Information (CSI) estimators in subsequent stages of the DAB receiver. The improvement factor depends upon the type of CSI estimation process used and the bandwidth of these estimation filters. Furthermore the normalized signal uses a smaller dynamic range since the gain through the FAC process is unity instead of $a^2$. Matching the delay of the composite signal path to the notch filter delay is also important for good performance.

The present invention provides cancellation and/or notch filtering of an interfering FM signal's instantaneous frequency to suppress the effects of interference from FM Broadcast signals. The invention is particularly applicable to FM In-Band On-Channel (IBOC) Digital Audio Broadcast (DAB) systems where first-adjacent FM signals act as interferers to the digital portion of the DAB signal. A device that performs this function is called a First Adjacent Canceller (FAC). This technique can also be used in a Hybrid IBOC FM DAB system to suppress the effects of interference from the host FM signal to the digital portion of the DAB signal.

While the present invention has been described in terms of what is believed at present to be the preferred embodiments thereof, it will be appreciated by those skilled in the art that various modifications to the disclosed embodiments may be made without departing from the scope of the invention as set forth in the appended claims. For example, the use of a FIR filter in the notch filtering process instead of a simple IIR filter may not significantly improve performance. The IIR filter may yield adequate performance with a significant reduction in computational complexity.

What is claimed is:

1. A method for processing a radio frequency signal, the method comprising the steps of:

receiving a composite signal including a signal of interest and an interfering signal;

processing the composite signal to produce an output signal;

controlling the magnitude of the output signal and the magnitude of the composite signal in response to the power of a signal component removed during the processing step; and combining the output signal and the composite signal to produce a blended signal;

wherein the step of processing the composite signal to produce an output signal comprises the steps of:

normalizing the composite signal to produce a normalized composite signal;

multiplying the composite signal by a complex conjugate of the normalized composite signal to produce a real signal;

filtering the real signal to produce a filtered signal; and multiplying the filtered signal by the normalized composite signal to produce the output signal.

2. A method for processing a radio frequency signal according to claim 1, wherein the step of controlling the magnitude of the output signal and the magnitude of the composite signal in response to the power of a signal component removed during the processing step comprises the steps of:

comparing the difference in power between the real signal and the filtered signal with upper and lower threshold values;

producing first and second control signals when the difference in power between the real signal and the filtered signal lies between the upper and lower threshold values;

multiplying the output signal by the first control signal; and multiplying the composite signal by the second control signal.

3. A method for processing a radio frequency signal according to claim 1, wherein the step of filtering the real signal to produce a filtered signal comprises the steps of:

producing a carrier amplitude estimate signal;

delaying the real signal to produce a delayed real signal; and subtracting the carrier amplitude estimate signal from the delayed real signal to produce the filtered signal.

4. A method for processing a radio frequency signal according to claim 3, wherein the step of producing a carrier amplitude estimate comprises the step of:

passing the real signal through a low pass filter.

5. A method for processing a radio frequency signal according to claim 1, wherein the step of filtering the real signal to produce a filtered signal delays the filtered signal, the method further comprising the step of:

delaying the normalized composite signal prior to the step of multiplying the filtered signal by the normalized composite signal.

6. A method for processing a radio frequency signal according to claim 1, wherein the step of controlling the magnitude of the output signal and the magnitude of the composite signal in response to the power of a signal component removed during the processing step comprises the steps of:

producing first and second control signals when the power of the signal component removed during the processing step lies between upper and lower threshold values;

multiplying the output signal by the first control signal; and multiplying the composite signal by the second control signal.

7. A method for processing a radio frequency signal according to claim 6, wherein the first control signal represents a first percentage, and the second control signal represents a second percentage, the sum of the first and second percentages being 100 percent.

8. An apparatus for processing a radio frequency signal, the apparatus comprising:
   means for receiving a composite signal including a signal of interest and an interfering signal;
   means for processing the composite signal to produce an output signal;
   means for controlling the magnitude of the output signal and the magnitude of the composite signal in response to the power of a signal component removed by the means for processing the composite signal; and
   means for combining the output signal and the composite signal to produce a blended signal;
   wherein the means for processing the composite signal to produce an output signal comprises:
      means for normalizing the composite signal to produce a normalized composite signal;
      means for multiplying the composite signal by a complex conjugate of the normalized composite signal to produce a real signal;
      means for filtering the real signal to produce a filtered signal; and
      means for multiplying the filtered signal by the normalized composite signal to produce the output signal.

9. An apparatus for processing a radio frequency signal according to claim 8, wherein the means for controlling the magnitude of the output signal and the magnitude of the composite signal in response to the power of a signal component removed by the means for processing the composite signal comprises:
   means for comparing the difference in power between the real signal and the filtered signal with upper and lower threshold values;
   means for producing first and second control signals when the difference in power between the real signal and the filtered signal lies between the upper and lower threshold values;
   means for multiplying the output signal by the first control signal; and
   means for multiplying the composite signal by the second control signal.

10. An apparatus for processing a radio frequency signal according to claim 8, wherein means for filtering the real signal to produce a filtered signal comprises:
   means for producing a carrier amplitude estimate signal;
   means for delaying the real signal to produce a delayed real signal; and
   means for subtracting the carrier amplitude estimate signal from the delayed real signal to produce the filtered signal.

11. An apparatus for processing a radio frequency signal according to claim 10, wherein the means for producing a carrier amplitude estimate comprises:
   a low pass filter.

12. An apparatus for processing a radio frequency signal according to claim 8, wherein the means for filtering the real signal to produce a filtered signal delays the filtered signal, further comprising:
   means for delaying the normalized composite signal prior to multiplying the filtered signal by the normalized composite signal.

13. An apparatus for processing a radio frequency signal according to claim 8, wherein the means for controlling the magnitude of the output signal and the magnitude of the composite signal in response to the power of a signal component removed by the means for processing the composite signal comprises:
   means for producing first and second control signals when the power of a signal component removed by the means for processing the composite signal lies between upper and lower threshold values;
   means for multiplying the output signal by the first control signal; and
   means for multiplying the composite signal by the second control signal.

14. An apparatus for processing a radio frequency signal according to claim 13, wherein the first control signal represents a first percentage, and the second control signal represents a second percentage, the sum of the first and second percentages being 100 percent.

15. An apparatus for processing a radio frequency signal, the apparatus comprising:
   an input for receiving a composite signal including a signal of interest and an interfering signal;
   a processor for processing the composite signal to produce an output signal;
   a controller for controlling the magnitude of the output signal and the magnitude of the composite signal in response to the power of a signal component removed by the processor; and
   a combiner for combining the output signal and the composite signal to produce a blended signal;
   wherein the processor for processing the composite signal to produce an output signal comprises:
      a divider for normalizing the composite signal to produce a normalized composite signal;
      a first multiplier for multiplying the composite signal by a complex conjugate of the normalized composite signal to produce a real signal;
      a filter for filtering the real signal to produce a filtered signal; and
      a second multiplier for multiplying the filtered signal by the normalized composite signal to produce the output signal.

16. An apparatus for processing a radio frequency signal according to claim 15, wherein the controller for controlling the magnitude of the output signal and the magnitude of the composite signal in response to the power of a signal component removed by the processor comprises:
   a comparator for comparing the difference in power between the real signal and the filtered signal with upper and lower threshold values;
   a signal generator for producing first and second control signals when the difference in power between the real signal and the filtered signal lies between the upper and lower threshold values;
   a third multiplier for multiplying the output signal by the first control signal; and
   a fourth multiplier for multiplying the composite signal by the second control signal.

17. An apparatus for processing a radio frequency signal according to claim 15, wherein the filter comprises:
   a carrier amplitude estimator for producing a carrier amplitude estimate signal;
   a time delay for delaying the real signal to produce a delayed real signal; and
   a subtractor for subtracting the carrier amplitude estimate signal from the delayed real signal to produce the filtered signal.

18. An apparatus for processing a radio frequency signal according to claim 17, wherein the carrier amplitude estimator comprises:

a low pass filter.

19. An apparatus for processing a radio frequency signal according to claim 15, wherein the filter for filtering the real signal to produce a filtered signal delays the filtered signal, further comprising:

a time delay for delaying the normalized composite signal prior to multiplying the filtered signal by the normalized composite signal.

20. An apparatus for processing a radio frequency signal according to claim 15, wherein the controller for controlling the magnitude of the output signal and the magnitude of the composite signal in response to the power of a signal component removed by the processor comprises:

a signal generator for producing first and second control signals when the power of a signal component removed during the processing step lies between upper and lower threshold values;

a first multiplier for multiplying the output signal by the first control signal; and a second multiplier for multiplying the composite signal by the second control signal.

21. An apparatus for processing a radio frequency signal according to claim 20, wherein the first control signal represents a first percentage, and the second control signal represents a second percentage, the sum of the first and second percentages being 100 percent.

* * * * *

UNITED STATES PATENT AND TRADEMARK OFFICE
CERTIFICATE OF CORRECTION

PATENT NO. : 6,622,008 B2
DATED : September 16, 2003
INVENTOR(S) : Brian W. Kroeger and Jeffrey Scott Baird It is certified that error appears in the above-identified patent and that said Letters Patent is hereby corrected as shown below:

Title page,
Item [57], Inventors, "Jeffrey Scott Baird, Elkridge, MD (US)" should read
-- Jeffrey Scott Baird, Columbia, MD (US) --.

Column 4,
Line 6, "f (t)" should read -- f(t) --.

Signed and Sealed this

Seventh Day of September, 2004

JON W. DUDAS
*Director of the United States Patent and Trademark Office*